G. H. MARSHALL.
PROCESS FOR PRODUCING CELLULOSE FROM FIBROUS MATERIALS
APPLICATION FILED JUNE 10, 1909.
982,379. Patented Jan. 24, 1911.
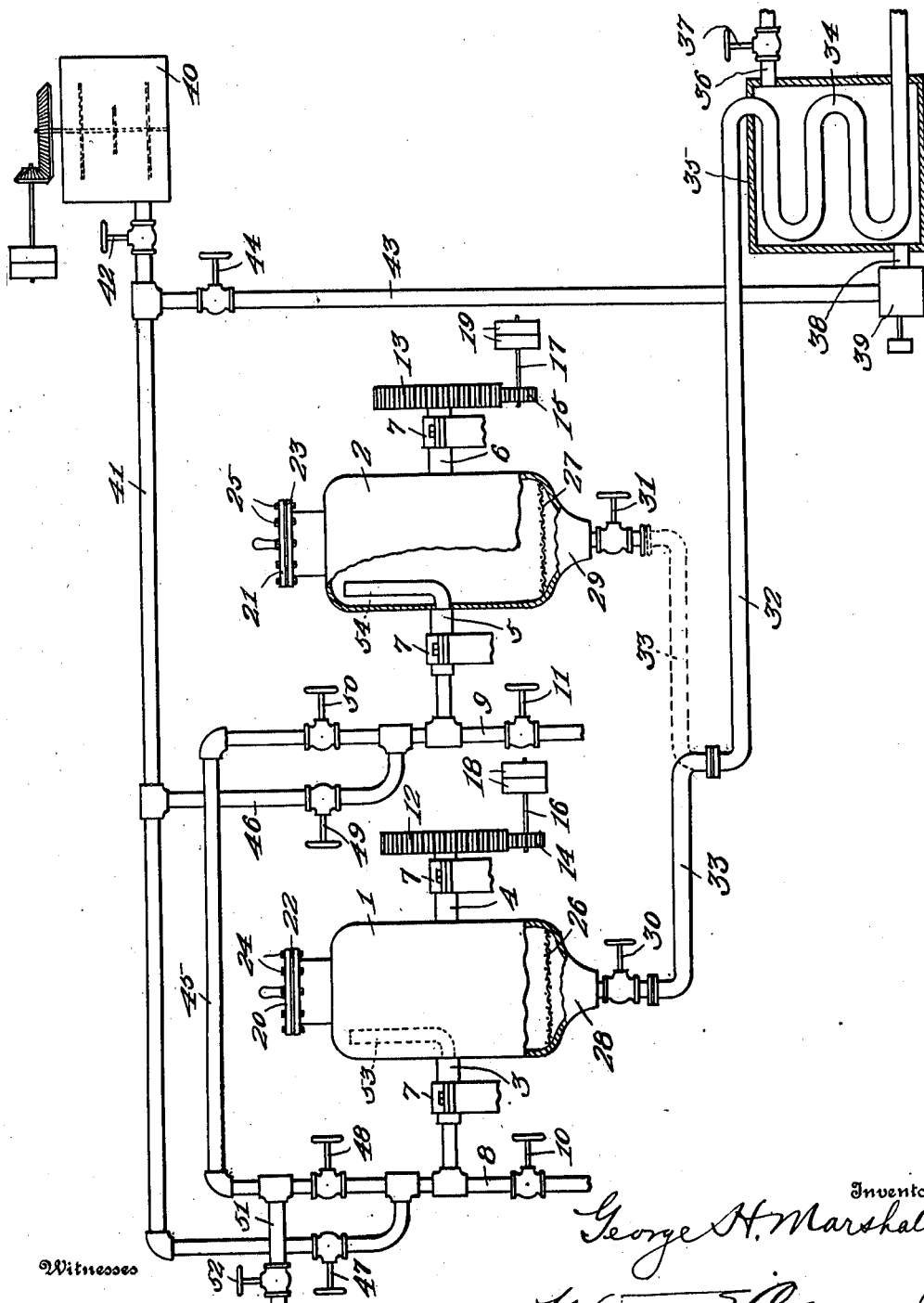

UNITED STATES PATENT OFFICE.

GEORGE H. MARSHALL, OF ROANOKE RAPIDS, NORTH CAROLINA.

PROCESS FOR PRODUCING CELLULOSE FROM FIBROUS MATERIALS.

982,379. Specification of Letters Patent. Patented Jan. 24, 1911.

Application filed June 10, 1909. Serial No. 501,377.

*To all whom it may concern:*

Be it known that I, GEORGE H. MARSHALL, a citizen of the United States, residing at Roanoke Rapids, in the county of Halifax and State of North Carolina, have invented certain new and useful Improvements in Processes for Producing Cellulose from Fibrous Materials, of which the following is a specification, reference being had to the accompanying drawings.

This invention relates to the production of pure cellulose fibers for paper making or textile purposes, from such materials as flax straw, cornstalks, sorghum, bagasse, sugar cane, reed grasses, or analogous substances, and has for its object to provide an improved process for the treatment of such raw material in a suitable manner to accomplish this desired result.

The process is essentially continuous although it has two stages, the result of the first stage being the softening of the piths and woody incrusting matter, and removing the sugars and gums and some of the cementing or incrusting materials which surround the cellulose fibers proper.

In both stages of the process I make use of closed vessels, preferably elongated rotating types of boilers, or digesters, a series of two or more of these vessels being employed whereby a greater economy is secured.

In the first stage of the process the materials are treated to a partial reduction or softening operation, whereby they are rendered more receptive for the second stage, the pithy or woody matters being partially exploded and their cellular or globular formation thereby broken up, and a portion of the incrusting matters removed by blowing under pressure. In this stage I employ a high steam pressure in connection with water and neutralizing substances of a weak alkaline nature, such as chalk, limestone dust, or lime, the object of the neutralizing substances being to prevent the accumulation of acids due to the disintegration of the sugars and incrusting matters by the heat due to the high pressure steam.

I employ from ten to twenty per cent. of the neutralizing substances, according to the condition of the raw material being treated. If the material is green, a lesser amount generally suffices, but if the material is dry and hard, a greater amount is required. I prefer, however, to employ just sufficient liquid to have the material thoroughly saturated, because when a minimum amount of liquid is thus used the neutralizing agent is permitted to reach all portions of the material and the steam is also enabled to act more effectively on the materials, as the latter are agitated by the rotation of the digester.

In the second stage of the process I employ strong alkaline liquors in the nature of solutions of sodium carbonate, sodium hydrate, or sodium sulfid, or of a mixture of these, according to whether the material is old, dry, green or new.

In order that persons skilled in the art may be enabled to understand and carry out my improved process, I will now proceed to fully describe mechanism whereby it may be carried out and while the mechanism to be described is probably the preferred construction, the process may be carried out by other mechanisms, the essence of the present invention being the process itself, independent of the means whereby it is carried out.

The preferred mechanism referred to is shown in the accompanying drawing which is a diagrammatic illustration, some parts being broken away, and parts being shown in section, the driving power being understood to be any suitable motor or engine.

Referring specifically to the drawing, 1 and 2 indicate two elongated rotary boilers or digesters, which are provided with trunnions 3, 4, 5 and 6, journaled in suitable bearings 7, the trunnions 3 and 5 being hollow to permit of the passage of steam therethrough to the digester, suitable steam pipes 8, 9, leading from any source of steam (not shown) being connected with said hollow trunnions and being provided with cut off valves 10 and 11.

The trunnions 4 and 6 are solid and, being continued beyond their bearings, are provided with gears 12, 13, meshing with pinions 14, 15 on counter shafts 16, 17, said shafts being driven by belting from any suitable driving pulley (not shown) engaged on fast and loose pulleys 18, 19, whereby the digesters may be rotated on the horizontal axes of the trunnions, and stopped, when desired, by shifting the belts from the fast to the loose pulleys in the ordinary manner.

The digesters are each provided with an opening or manhole at one end, closable by means of covers 20, 21, which may be secured in a steam tight manner by means of the gaskets 22, 23 and bolts 24, 25.

The materials to be treated are placed in the digesters through the manholes, screens 26, 27, near the opposite ends of said digesters, preventing the passage or discharge of the treated material through spouts 28, 29 at the opposite ends which are provided for discharging the liquid contents of the digesters and are provided with suitable blow-off valves 30, 31.

At 32 is indicated a blow-off or exhaust pipe, which may be connected with either spout 28 or 29, by a swing pipe 33, said blow-off pipe passing (in the form of a coil 34) through a water-heater 35, to the atmosphere, the water-heater being provided with a water-inlet pipe 36 with valve 37, whereby cold water may be admitted, and a discharge pipe 38 whereby hot water may be forced from the heater by a pump 39 through a line of piping as hereinafter explained.

At 40 is shown a tank, or agitator, from which leads a pipe 41 having a valve 42, which pipe, beyond said valve, is connected with the pump 39 by a pipe 43 having a valve 44. The pipe 41 extends to and joins a cross-over pipe 45 leading from steam pipe 8 to steam pipe 9, and a branch pipe 46 also leads from said pipe 41 to the cross-over pipe, the pipes 41, 45 and 46 being supplied with suitable valves 47, 48, 49 and 50. A vent pipe 51 leads from the cross-over pipe 45 to the atmosphere and is provided with a valve 52.

Steam entering the digesters through pipes 8 and 9 is properly distributed and delivered therein by suitable intake pipes 53 and 54 leading into the body of the material contents.

The first stage of my process is carried out as follows: The materials to be treated are first introduced into the digesters 1 and 2 either in a whole or broken condition as may be preferred for convenience in handling. After the full amount of material is in the digester 1, the necessary amount of water which has been previously mixed in the agitator 40 with the chalk, limestone, lime, or other neutralizing substance, is run into said digester through pipe 41. When the materials are in a raw state and hence contain a great deal of moisture, a small amount of liquid will be sufficient to saturate them, but when the materials are hard and dry a greater quantity of the liquid is necessary, such quantity being usually from one to three times the weight of such dry materials. The cover 20 is then placed on the digester and securely bolted down on the gasket 22 to make a steam tight joint. All of the valves except steam valve 10 being closed, the steam is turned on slowly and allowed to enter the digester 1, (which is now rotated), for several minutes, or until a pressure of say thirty pounds is reached, when the steam valve 10 is closed, the digester being stopped in a vertical position, with the manhole end uppermost. All valves being now closed the valves 48 and 52 are opened, thus allowing the air contained in the digester in a heated condition to pass through these valves and thence to the atmosphere. After all the air in the digester is exhausted, the valves 48 and 52 are closed and the steam valve 10 again opened, and the digester again rotated. The steam pressure is now allowed to rise slowly to eighty pounds, say in half an hour. During the next half hour the steam pressure is allowed to rise to one hundred pounds, and during the next succeeding half hour, the pressure is allowed to rise to one hundred and fifty pounds. The final pressure of one hundred and fifty pounds having been reached in one and one half hours, the digester is then stopped, in a vertical position, with the blow off valve 30 at the lower extremity, and connection is then made with the swing pipe 33. The blow-off valve 30 is now partially opened, allowing the liquor from the digester to pass through the screen, or strainer bottom 26, out through valve 30, pipe 33, pipe 32 and coil 34 in the heating tank 35, to the atmosphere. The blowing off is continued for five minutes, with the live steam valve 10 open, after which time the live steam valve is tightly closed and the blow-off valve 30 is opened wide, as quickly as possible, thus allowing the pressure in the digester to reduce in the shortest possible time, and thereby creating an expansive or exploding effect upon the piths or woody portions of the stalks, as in the flax straw. The pressure due to steam having at this point subsided, the water in tank 35, which has been heated by the blow-off steam passing through coil 34, is now pumped by pump 39 through pipe 43, valve 44, pipe 41, valve 48 and pipe 8, into the digester and forced through the material inside of it and out through swing pipe 33 and blow-off pipe 32 to the sewer, thus washing out any residual matter which was not expelled during the blowing-off operation.

From the above it will be seen that the object of the first stage of my process is to break up the cellulose formation of the piths and glutinous matters and remove as much as possible of the same, so as to make the materials receptive of the subsequent strong, alkaline treatment which forms the second stage of the process; and it will be further noted that this first stage of the process is performed with a minimum amount of water and an inexpensive neutralizing agent which means economy in the more expensive chemicals used in the second stage of the process, and also economy in the use of fuel, because by heating the wash water by the steam and liquids exhausted from the digester, the materials are kept throughout at a high temperature and do not have to be reheated at the expense of extra fuel, and also the wash water does not have to be heated by the expenditure of extra fuel. Keeping the materials throughout at a high temperature is further advantageous in that should cold water be used to wash the materials, the glutinous matters in the materials would tend to coagulate and of course the materials would have to be again heated for the second stage of the process, and such reheating would mean an extra amount of fuel. By employing just sufficient water to keep the neutralizing substances in circulation, the operation may be performed in a very much shorter time and a smaller amount of fuel will be necessary. Furthermore, because the materials are merely saturated and then subjected to varying steam pressure due to the varying temperature, the materials are not surrounded by a large volume of liquid and boiled in the usual manner, but on the contrary the materials are free to expand and contract so that the strains break up the cellular formation. The advantage of blowing out the air and gases at about thirty pounds pressure is that it frees the digester of the heated air and gases developed from the materials under treatment and consequently gets rid of such air and gases at the most economical point as to waste of steam caused by the operation, and furthermore, the elimination of the air and gases at this temperature has no harmful effect on the materials under treatment. The object of this blowing operation is to get the effect of a steam atmosphere only and have the reducing effect of the heat and moisture of the steam without the harmful effect that air and foreign gases have at high temperatures. The first stage of the process is now completed and during this operation, a charge of liquor has been supplied to tank 40 containing sodium carbonate, sodium hydrate, sodium sulfid, or a mixture of these three according to the material to be treated, the strength ranging from three to six per cent., being weaker for green, and stronger for dry or seasoned materials. This liquor above mentioned is now introduced into the digester and its contents and the digester being again set in rotation and the live steam valve 10 partially opened, the pressure being allowed to rise again to say thirty pounds, and then the air and entrained gases are blown to the atmosphere as in the first stage after which the steam pressure is raised as follows: viz., during the first half hour to eighty pounds, during the second half hour to one hundred and twenty pounds, and during the third half hour to one hundred and sixty pounds. During these operations in digester 1, a similar charge of the raw material has been placed in digester 2, and is ready for the first steam, so that as the steam in digester 1 has reached a pressure of one hundred and sixty pounds, the steam is shut off from that digester and is blown from it through cross over pipe 45 and pipe 9 into digester 2, the contents of digester 2 being thereby heated to thirty pounds pressure by this blow-off steam from digester 1, thereby effecting a considerable economy in steam.

When through the blowing operation just above mentioned, the pressure has arisen in digester 2 to thirty pounds, all valves are closed and digester 1 which is standing in a vertical position, is connected up to the blow-off pipe 32 and the remaining pressure blown to any desired point, carrying with it the resultant liquors which may be treated for the recovery of the soda, if desired. After the resultant liquors have been blown out, hot water, heated by the second blow-off, is introduced into the digester 1, and forced through the contents of the same out through the blow-off pipe 32 to any desired point. The contents of the digester 1 may then be dumped by rotating the digester to bring the manhole to the bottom and the treated material conveyed to any desired point for washing and bleaching by any of the present well known methods.

In order to more clearly distinguish my improved process from similar processes heretofore produced, I would add that the first stage is a treatment of varying steam pressure and heat with a minimum amount of water and a weak alkaline neutralizing agent, whereby the action of the varying heat and pressure prepares the materials for the second stage; and the second stage of the process is a treatment of the materials with strong alkalies or alkaline sulfids in connection with a large amount of water, which latter acts as the solvent of the chemicals.

Having thus fully described my invention, what I claim as new and desire to secure by Letters Patent, is—

1. The process for the treatment of cellulose yielding materials containing piths or woody stalks which comprises the partial reduction of the material in a digester by submitting it to a gradually rising steam pressure in the presence of a small amount of water and a mild neutralizing agent, and then suddenly reducing the pressure whereby the piths and woody matters will be subjected to an explosive action, and afterward treating the material to a gradually rising steam pressure in the presence of water and a stronger neutralizing agent, the material being kept throughout at a high temperature.

2. The process for the treatment of cellulose yielding materials containing piths or woody stalks which comprises the partial reduction of the material in a digester by submitting it to a gradually rising steam pressure in the presence of a small amount of water and a mild neutralizing agent, and then suddenly reducing the pressure whereby the piths and woody matters will be subjected to an explosive action, washing the material while in the digester, and then treating the material to a gradually rising steam pressure in the digester in the presence of water and a strong, neutralizing agent, the material being kept throughout at a high temperature.

3. The process for the treatment of cellulose yielding materials containing piths or woody stalks comprising the introduction of the material into a steam-tight vessel, introducing into said vessel with the material a solution containing water and an alkaline neutralizing agent, introducing steam pressure slowly into the vessel and contents until the pressure of about thirty pounds is attained, shutting off the steam, exhausting the heated air and gases from the vessel, again introducing steam slowly until about one hundred and fifty pounds pressure is developed, suddenly reducing the pressure to cause the piths and woody matters to be subjected to an explosive action, and afterward treating the material continuously under a gradually rising steam pressure in the presence of water and a stronger alkaline neutralizing agent.

4. The process for the treatment of cellulose yielding materials containing piths or woody stalks comprising the introduction of the material into a steam-tight vessel, introducing into said vessel with the material a solution containing water and an alkaline neutralizing agent, introducing steam pressure slowly into the vessel and contents until the pressure of about thirty pounds is attained, shutting off the steam, exhausting the heated air and gases from the vessel, again introducing steam slowly until about one hundred and fifty pounds pressure is developed, suddenly reducing the pressure to cause the piths and woody matters to be subjected to an explosive action, washing the material in the digester, then treating the material continuously under a gradually rising steam pressure in the presence of water and a stronger alkaline neutralizing agent, and then washing the material, the latter being kept throughout at a high temperature.

5. The process for the treatment of cellulose yielding materials containing piths or woody stalks comprising the introduction of the material into a steam-tight vessel, introducing into said vessel with the material a solution containing water and an alkaline neutralizing agent, introducing steam pressure slowly into the vessel and contents until a pressure of about thirty pounds is attained, shutting off the steam, exhausting the heated air and gases from the vessel, again introducing steam pressure and permitting the pressure to slowly rise until about one hundred and fifty pounds pressure is attained, blowing the liquids out of the vessel and suddenly reducing the pressure to effect an explosive action on the contents thereof, and afterward treating the material continuously under a gradually rising steam pressure in the presence of water and a stronger alkaline neutralizing agent.

6. The process for the treatment of cellulose yielding materials containing piths or woody stalks which comprises the partial reduction of the material in a digester in the presence of water and a mild neutralizing agent by submitting the material to a low steam pressure, then exhausting air and gases from the digester, then gradually increasing the steam pressure in the digester while the material is being agitated, then suddenly reducing said pressure to cause the piths and woody matters to be subjected to an explosive action and afterward treating the material continuously under a gradually rising steam pressure in the presence of water and a strong neutralizing agent.

7. The process for the treatment of cellulose yielding materials containing piths or woody stalks which comprises the partial reduction of the material in a digester in the presence of water and a mild neutralizing agent by submitting the material to a low steam pressure, then exhausting air and gases from the digester, then gradually increasing the steam pressure in the digester while the material is being agitated, then suddenly reducing the pressure in the digester, by blowing off the liquids, then washing the material in the digester and afterward treating the material continuously under a gradually rising steam pressure in the presence of a strong neutralizing agent, the material being kept throughout at a high temperature.

8. The process for the treatment of cellulose yielding materials containing piths or woody stalks, which comprises the partial reduction of the material in a digester in the presence of water and a mild neutralizing agent, by submitting the material to a low steam pressure, then exhausting air and gases from the digester, then gradually increasing the steam pressure in the digester while the material is being agitated, then suddenly reducing the pressure in the digester by blowing off the liquids, then washing the material in the digester, then subjecting the material to a solution containing a strong neutralizing agent, then subjecting the material to a low steam pressure, then allowing the heated air and gases to escape from the digester, then gradually increasing the steam pressure in the digester, then blowing off the liquids from the digester and again washing the material in the digester.

9. The process for the treatment of cellulose yielding materials containing piths and woody stalks which comprises the partial reduction of the material in a digester in the presence of water and a mild neutralizing agent by suddenly reducing the pressure in the digester and blowing off the liquids, then washing the material in the digester, then reducing the material a second time by subjecting it to a gradually rising steam pressure in the presence of a solution containing a strong, neutralizing agent, then suddenly reducing the pressure in the digester and blowing off the liquids, and then washing the materials.

In testimony whereof I hereunto affix my signature in the presence of two witnesses.

GEO. H. MARSHALL.

Witnesses:
 THOS. R. H. MURPHY,
 J. T. CHASE.